(12) United States Patent
Kreitz et al.

(10) Patent No.: US 8,786,452 B1
(45) Date of Patent: Jul. 22, 2014

(54) OVERHEAD LEAK PROTECTION SYSTEM FOR RACK-MOUNTED CRITICAL SYSTEMS

(75) Inventors: Michael T. Kreitz, Phoenix, AZ (US); Randall E. Peters, Chandler, AZ (US); Rick B. Arabian, Whittier, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 312 days.

(21) Appl. No.: 13/413,465

(22) Filed: Mar. 6, 2012

(51) Int. Cl.
*G08B 21/00* (2006.01)

(52) U.S. Cl.
USPC ........................................ 340/605; 340/572.1

(58) Field of Classification Search
USPC .............................................. 340/605, 572.1
See application file for complete search history.

(56) References Cited

U.S. PATENT DOCUMENTS

| | | | | |
|---|---|---|---|---|
| 3,823,304 A | * | 7/1974 | Siemianowski | 219/213 |
| 5,081,422 A | * | 1/1992 | Shih | 324/693 |
| 5,747,734 A | * | 5/1998 | Kozlowski et al. | 174/50 |
| 7,009,510 B1 | * | 3/2006 | Douglass et al. | 340/531 |
| 7,126,486 B2 | * | 10/2006 | Kroll et al. | 340/604 |
| 7,895,855 B2 | * | 3/2011 | Gooch | 62/259.2 |
| 8,180,495 B1 | * | 5/2012 | Roy | 700/278 |
| 8,469,782 B1 | * | 6/2013 | Roy | 454/187 |
| 8,628,154 B2 | * | 1/2014 | Caveney et al. | 312/198 |
| 2004/0244310 A1 | * | 12/2004 | Blumberg | 52/79.1 |
| 2006/0192678 A1 | * | 8/2006 | Garabedian | 340/605 |
| 2009/0000243 A1 | * | 1/2009 | Blumberg | 52/750 |
| 2011/0094714 A1 | * | 4/2011 | Day | 165/121 |
| 2012/0255816 A1 | * | 10/2012 | Bloch | 187/401 |

OTHER PUBLICATIONS

Sensaphone; "Infrastructure Monitoring Systems"; brochure; 6 pages; May 2007.
Turtle Shell Industries; http://www.turtleshellproducts.com; homepage; copyright 2010; retrieved Mar. 6, 2012.

* cited by examiner

*Primary Examiner* — Jennifer Mehmood
*Assistant Examiner* — Rufus Point (57) ABSTRACT

A leak protection system deflects leaking water away from the rack-mounted critical systems and detects and reports the existence of a leak. In embodiments, this is accomplished without compromising access to or visibility of the critical systems or thermal management of heat dissipated by the critical systems. In embodiments, the leak protection system produces a minimalist visual footprint with limited impact on the aesthetics of the rack-mounted critical systems and data center.

20 Claims, 6 Drawing Sheets

OVERHEAD LEAK PROTECTION SYSTEM FOR RACK-MOUNTED CRITICAL SYSTEMS

BACKGROUND

1. Field of the Invention

This invention relates to the protection of rack-mounted critical systems against water infiltration through ceiling leaks and burst overhead pipes.

2. Description of the Related Art

In today's digital information-based world, data centers are occupied by row after row of rack-mounted critical systems such as computer servers, memory systems, switches and other electronic equipment. Data cabling and fiber optics are distributed along the rows via ladder racks and ducting, respectively, mounted above the "racks". Maintenance of the equipment and data cabling and fiber optics, the stored data and 24/7 operation of these racks can be vital to the company that provides the data center and service as well as to the customers who use the services of data center and the final end-users of the data.

The possibility of water infiltration into the racks due to a leaky ceiling or pipe breakage threatens the equipment, data and 24/7 service. Regardless of the redundant design of most data centers, significant loss of equipment and or business productivity can be lost if a system or group of systems is damaged by unintended water leakage.

In many data centers, the racks are placed on a raised floor to protect against water accumulation due to leaks in the ceiling or other flooding. Data centers may use environmental monitoring systems to detect water accumulation on the floor. For example, a zone water detector that includes several feet of water detection rope and a water sensor may be placed on the floor around a critical piece of equipment. If the rope becomes wet, the sensor detects a change in state and issues an alarm. Such systems generate a notification via alarm/email/text/phone when an alarm condition is detected.

Unfortunately, ceiling leaks or burst pipes can directly infiltrate the racks from above causing considerable damage. Ceiling leaks can also damage the ceiling causing debris to fall onto and further damage the racks. A zone water detector may be placed in the ceiling to detect water accumulation. However, by the time a notification is generated due to water accumulation on the floor or in the ceiling and a mitigation response is initiated the damage may be done.

Turtleshell Industries provides a Turtle Shell® product providing critical systems protection from water and debris. The modular system is constructed of a lightweight frame and waterproof shell that is mounted above a cabinet. The waterproof shell resembles a turtle shell in both in its half-moon shape and semi-transparent green color. The shell is formed from a polycarbonate plastic that is lightweight, strong and flexible enough to be formed into the "turtle shell" without breaking. The shells can be connected together to accommodate protection for any length of cabinet rows. Standard shells provide ample overhang on both sides of a 36-inch cabinet. Custom shells can be made to any width or arc depending on the location, ceiling heights, heat dissipation requirements and existing services (conduits, fiber troughs, cable racks, etc.). In locations with existing services, the shells can be penetrated and sealed to prevent water leaks around the services. Shells also come with manual pull down curtains, which are deployed when water infiltration occurs. A motorized curtain option is available for un-manned locations.

SUMMARY

The present invention provides a leak protection system for rack-mounted critical systems. In one or more embodiments, the system provides both leak deflection and detection capabilities without compromising access to or visibility of the critical systems or thermal management of heat dissipated by the critical systems, while limiting the visual impact of the leak protection system on the aesthetics of the data center.

In one or more embodiments, a leak protection system includes a panel mounted above the rack-mounted critical system and cabling structure at an angle with a highest point that overhangs the back of the rack and a lowest point that overhangs the front of the rack to deflect water that runs down the panel towards a front edge. A raised lip runs along the front edge of the panel at the lowest point to form a water channel to collect water. A water detection system is positioned in and along the water channel to detect the presence of water and to issue a leak alert. The collected water is evacuated through a gap in the water channel.

In one or more embodiments, a leak protection system is provided for multiple rows of rack-mounted critical systems, each row including multiple rack-mounted critical systems positioned side-by-side and an overhead cabling structure for routing cabling to the racks. One or more panels are mounted side-by-side above each row and the cabling structure at an angle with a high point that overhangs the back of the rack towards a hot aisle and a low point that overhangs the front of the rack towards a cold aisle to deflect water that runs down the panel towards a front edge. Each panel is angled to allow access to the cabling and to direct the rising heat out the back of the rack to the hot aisle. Each panel is formed from a clear transparent acrylic material to allow overhead light through the panel to provide visibility of the cabling and rack-mounted critical systems while limiting the visibility of the panel. One or more raised lips run along the front edge of the one or more panels at the low point to form a water channel to collect water in each row. Each row is provided with a water detection system including a water detector positioned in and along the water channel to detect the presence of water and a sensor that monitors a change in state of the water detector to issue a leak alert. For example, the water detector may comprise a water detection rope. The collected water is evacuated through one or more gaps in the water channel, formed either in the panels or between adjacent panels. A single sensor aggregator port is responsive to the leak alert from the water detection systems for the multiple rows to generate and transmit a leak alert notification.

In one or more embodiments, a leak protection system includes a panel mounted above the rack-mounted critical system and cabling structure configured to deflect water to run down the panel towards at least one edge. A raised lip runs along the at least one edge of the panel to form a water channel to collect water. A water detector system is positioned in and along the water channel to detect the presence of water and to issue a leak alert. The collected water is evacuated through a gap in the water channel.

These and other features and advantages will be apparent to those skilled in the art from the following detailed description of embodiments, taken together with the accompanying drawings, in which:

DETAILED DESCRIPTION

Data centers are constructed to provide very reliable power, cooling and security. They are often not so well equipped to handle unforeseen environmental problems such as leaky roofs and overhead water pipes and the damage water infiltration may cause to the row after row of rack-mounted critical systems.

Solutions to retrofit data centers to protect the rack-mounted critical systems should not only protect the systems from overhead leaks but preferably should do so in a manner that is compatible with the operation and maintenance of the critical systems and data center. In the age of 'lights-out' datacenters, (where few persons are actually on-site) a solution preferably should provide the ability to detect and transmit alert notifications when a leak exists above a rack-mounted critical system. Data center airflow design provide for removing the heat generated by critical systems. The leak protection system preferably should not impede the airflow design. Data center staff require access to and visibility of the area above the critical systems to perform maintenance on the data cabling. The leak protection system should preferably not interfere with access or degrade visibility. Data centers are also becoming showpieces for high-tech organizations. Any solution employed preferably should not distract negatively from either the functionality or the aesthetics of the data center.

In one or more embodiments, a leak protection system provides a comprehensive solution against the effects of leaking water for rack-mounted critical systems. Embodiments of the leak protection system not only deflect leaking water away from the rack-mounted critical systems but also detect and report the existence of a leak. In one or more embodiments, this is accomplished without impeding access to or visibility of the critical systems or impeding airflow. In one or more embodiments, the leak protection system produces a minimalist visual footprint with limited impact on the aesthetics of the rack-mounted critical systems and data center.

Referring now to FIGS. 1a through 1d, in an embodiment of a data center 10 row after row 11 of rack-mounted critical systems (hereafter referred to as "racks") 12 are arranged on a floor 14 of the data center. Lights 16 are hung from a ceiling 18 to provide illumination. The arrangement of the rows and rack-mounted critical systems is such to enhance both the functionality and aesthetics of the data center.

Alternating hot and cold aisles 20 and 22, respectively, separate rows 11. The racks, which are typically designed so that heat emanates towards the rear of the rack and rises, are positioned with their backs toward the hot aisles 20 per conventional data center airflow design. In an open-air plenum design, cool air is forced through the floor up into to the racks. In a closed-air plenum design, hot air rises up through a drop ceiling and is ducted to the intake of an air conditioning system. In either case, the airflow design attempts to keep from contaminating the cold aisle with warm air, referred to as "cold-aisle contamination". The racks generate a tremendous amount of heat. The airflow design is important to the operation of the data center.

Cabling structures for routing cabling between racks 12 are mounted above the rows. These cabling structures may include a ladder rack 24 for routing power and electrical data cables or a fiber duct 26 for routing optical fiber cables. Data center staff require frequent access to the ladder rack and fiber duct to access the cabling and electrical receptacles to perform various maintenance functions. In order to perform their tasks efficiently and correct, the staff require easy access to the cabling and good visibility.

Water leakage may occur due to a leak in ceiling 18 during a rainstorm or to a leak in an overhead pipe. Depending on the nature of the failure, water may drip slowly, and either intermittently or continuously, from one or more spots onto one or more of the racks or water may gush down upon the racks.

In an embodiment, a leak protection system 40 for a given rack 12 comprises a panel 42 mounted on supports 44 above the rack and cabling structures, at an angle with a highest point 46 that overhangs the back 48 of the rack and a lowest point 50 that overhangs the front 52 of the rack to deflect water 54 that runs down the panel towards a front edge 56. The panel is mounted so that its highest point 46 is higher than the cabling structures. The lowest point 50 may be higher or lower than the cabling structures. The angle formed by the panel with respect to the floor is, for example, suitably between approximately five degrees and twenty degrees. Supports 44 may be attached to the rack, the floor or the ceiling. A raised lip 58 runs along the front edge of the panel at the lowest point to form a water channel 60 to collect water. The raised lip may, for example, extend approximately orthogonal from the panel, e.g. about two inches. The lip may be formed at other angles and heights sufficient to form the water channel.

Panel 42 (and supports 44 and lip 58) is suitably formed from a clear transparent material such as an Acrylic plastic. Acrylic materials pass UV from the overhead lights and thus will not age and "yellow" over time. Acrylic materials are fairly inflexible; hence panel 42 is suitably flat. Acrylic materials are relatively weak and may bow under their own weight if not reinforced. Raised lip 58 adds rigidity. In some embodiments, a raised lip 61 along the rear edge also adds rigidity.

A water detection system comprises a water detector 62 positioned in and along the water channel 60 to detect the presence of water and a sensor 63 responsive to a change in state of the water detector to issue the leak alert. As shown, water detector 62 comprises a water detection rope that is laid in the water channel and held snugly in place by one or more clips 64. Alternately, a water detection tape could be placed in the water channel. By collecting water in the water channel and placing the detector in the channel, the system can quickly and reliable detect even small leaks.

The collected water is evacuated through a gap 66 in the water channel. Gap 66 may be formed within the front edge of the panel or to either side of the panel. The water may be allowed to fall freely to the floor. Alternately, tubing 68 may be attached to gap 66 to collect and route the water away from the rack as shown in the close-up view in FIG. 1d.

In this embodiment, panel 42 protects rack 12 from falling water by deflecting water to water channel 60 where the water is evacuated through gap 66. The water detection system detects the presence of water in water channel 60 and issues a leak alert. Angling panel 42 so that its high point overhangs the back of the rack permits unimpeded access to the cabling structures where electrical receptacles and power and data cabling reside. Data center staff benefit from the transparent design that allows visible light to pass therethrough to the cabling structures. Additionally, the transparent design often goes un-noticed and remains difficult to see in photographs. Additionally the angle of the panel also allows warm air to rise up and away from the front of the racks at the cold-aisle side toward the rear of the cabinet at the warm-aisle side. This aids in the isolation of warm air to the rear of the cabinet (as per conventional data center airflow design) and prevents the recirculation of warm air often referred to as "cold-aisle contamination." It is important that the panel not trap hot air.

Figure 1A:
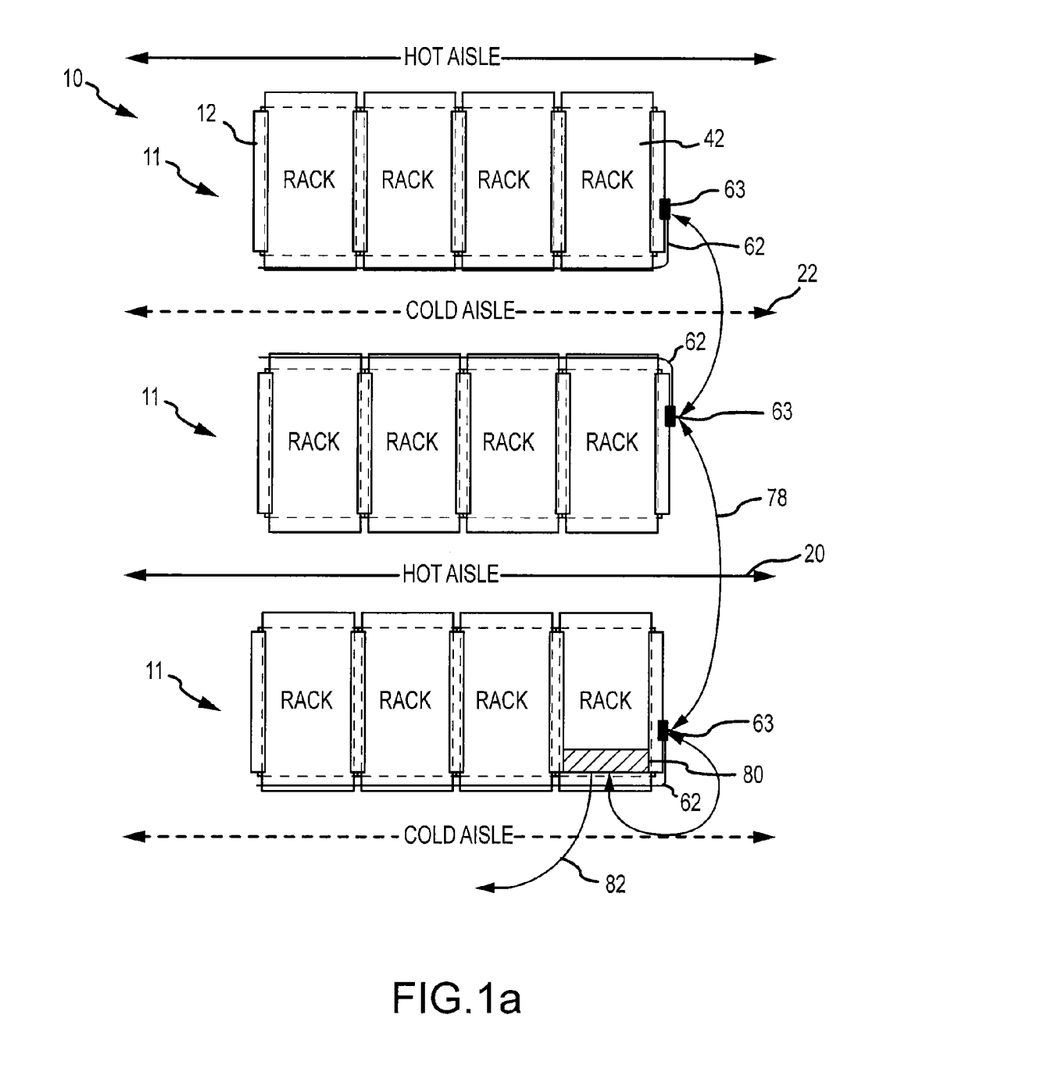
FIGS. 1a through 1d are top, front, side and close-up side views of an embodiment of an installed leak detection system.
Figure 1B:
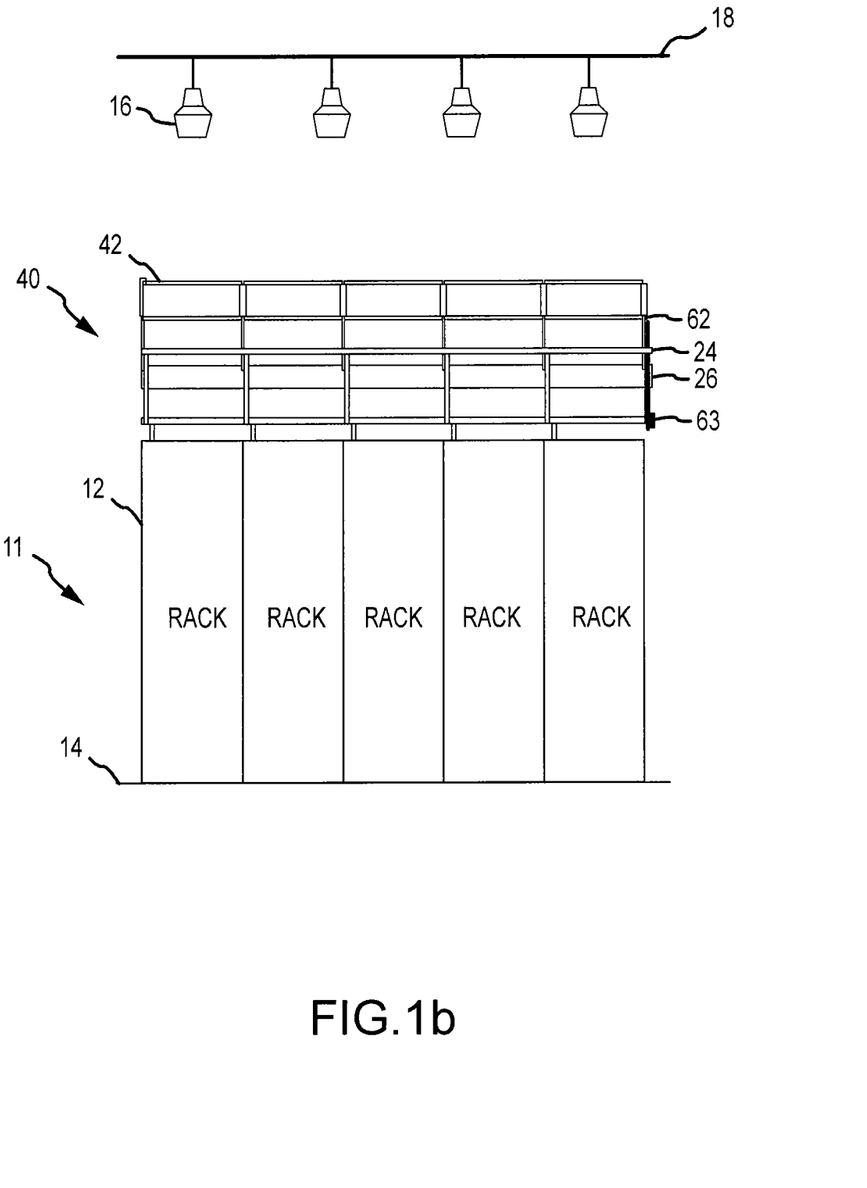
Figure 1C:
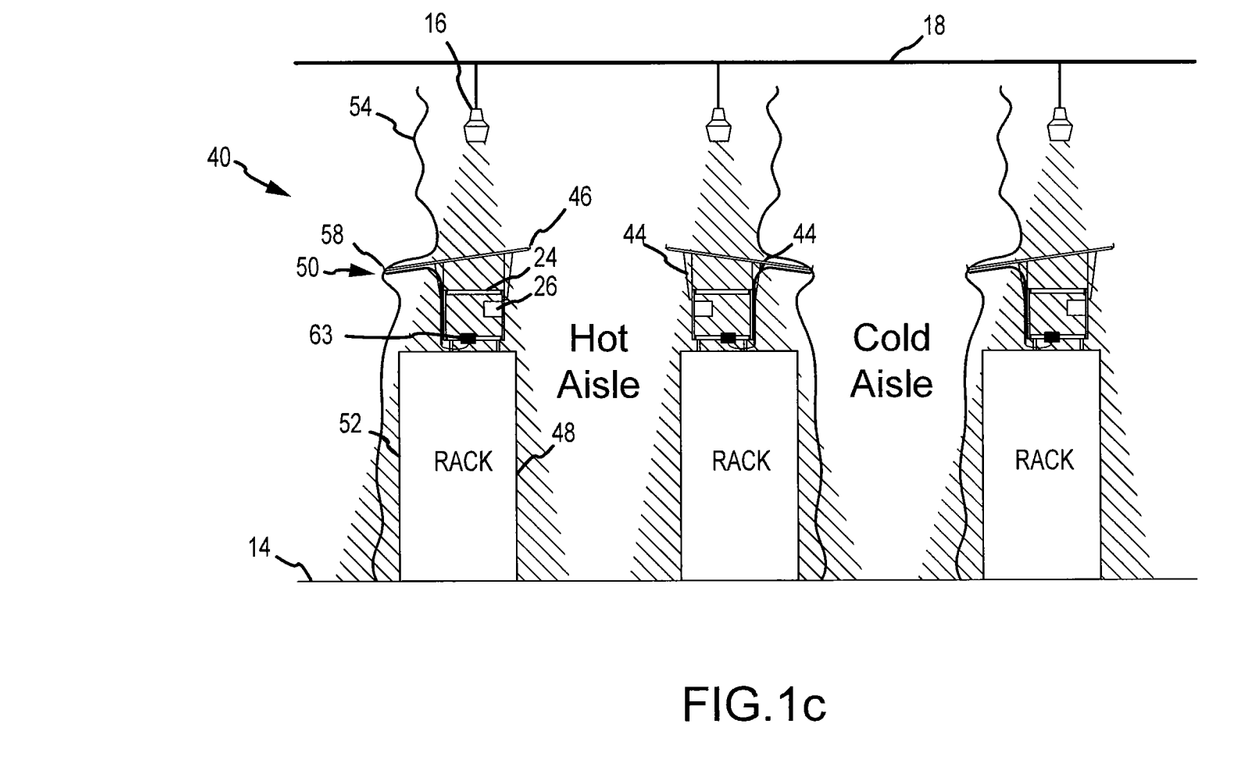
Figure 1D:
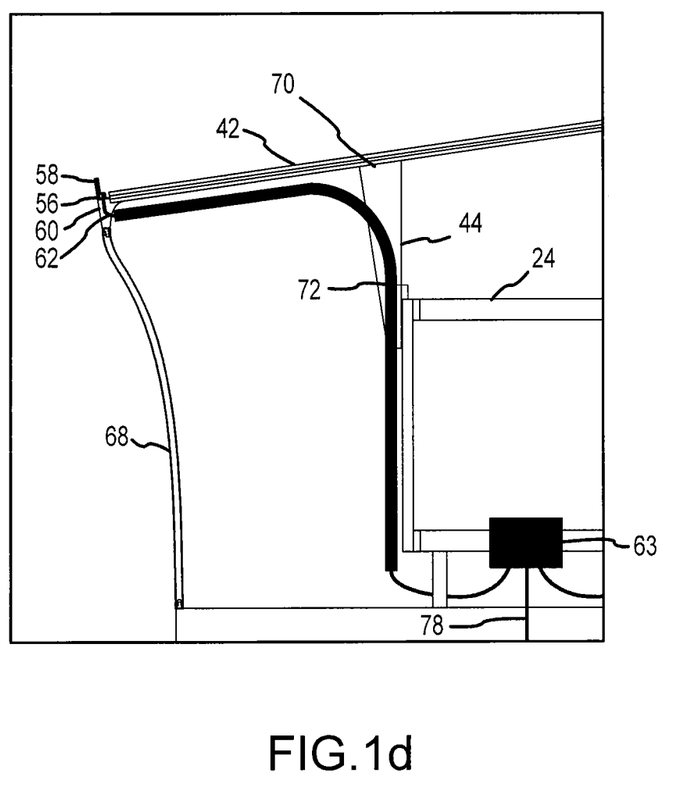
Figure 2A:
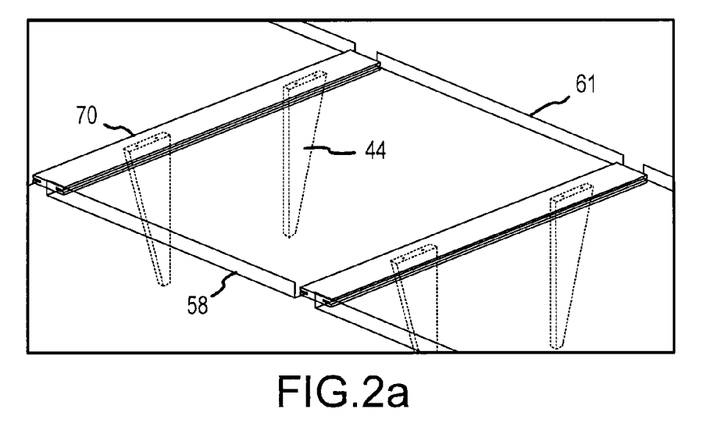
FIGS. 2a and 2b are detailed views of an embodiment of interconnected rain shields utilizing a common water detection rope.
Figure 2B:
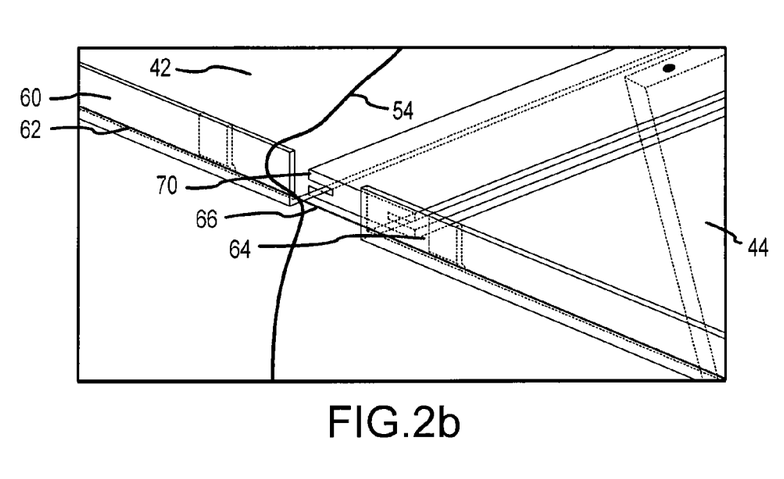
Figure 3A:
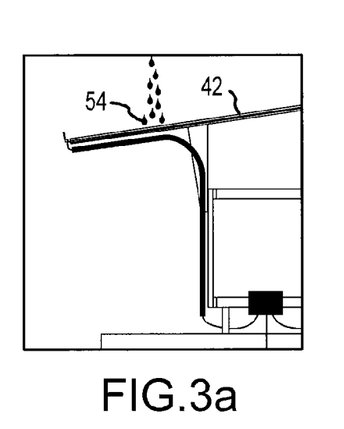
FIGS. 3a through 3d are a sequence of diagrams illustrating the deflection, detection and evacuation of water.
Figure 3B:
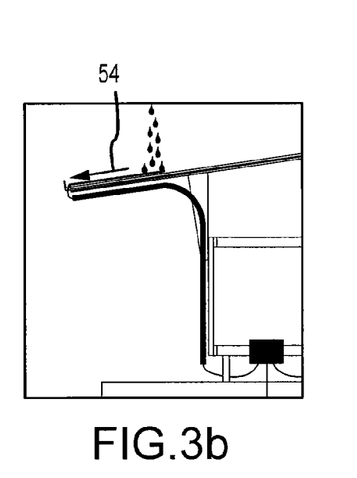
Figure 3C:
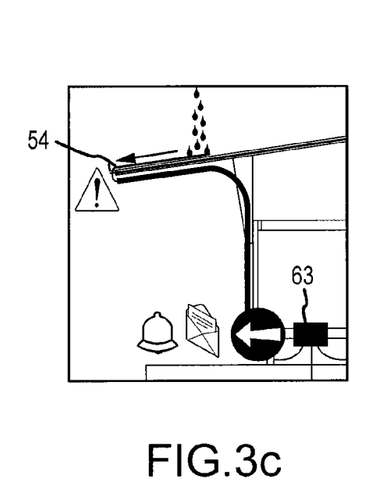
Figure 3D:
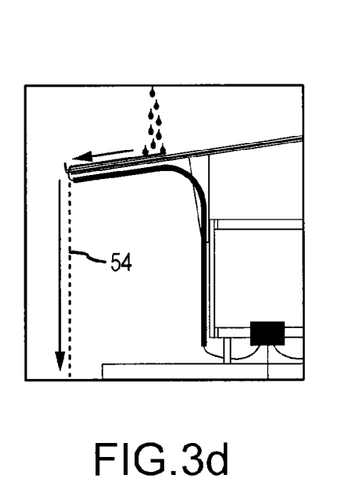

As shown in the drawings, the leak protection system 40 may be scaled from a single rack 10 to multiple racks positioned side-by-side within row 11 and from there to multiple rows within the data center. In an embodiment best shown in FIGS. 2a and 2b, supports 44 are each provided with an interlocking support bracket 70 that interlock adjacent panels 42 to form a contiguous panel above the row. As shown, support bracket 70 has an H-channel design that receives an edge of two adjacent panels. A silicon bead in the H-channel holds the panel in place. This approach allows the leak protection system to be installed incrementally and modularly as additional racks are added. Additionally the water detection system can scale to accommodate the row by extending the water detector e.g. rope or tape along the water channel formed by the additional panels. The gaps are suitably formed between adjacent panels. A single sensor can serve the entire row and may generate a leak alert that simply indicates that a leak has occurred in the row or a leak alert that includes the exact position of the leak along the rope or tape. This position can be correlated to the position of the racks to identify a particular rack. As shown in FIG. 1d, the end of the rope/tape may be routed from the end of the water channel through conduit 72 down to the sensor at the end of the row.

To accommodate multiple rows, a daisy-chain system 78 (e.g. a CAT5 network) may be utilized to connect multiple rows to a single sensor aggregator port 80. The port transmits a leak alert notification via alarm, phone, email, SNMP, text, tweet, etc. through a network uplink 82. This notification may include the sensor that reported the leak, the specific rack associated with the leak and the time of the leak. This allows for greater sensor density without the need to add additional aggregators.

Referring now to FIGS. 3a through 3d, water 54 drops from the ceiling making contact with angled panel 42 above a rack. Water 54 runs down the panel to the front edge where the water is collected in the water channel and makes contact with the water detection rope, causing the rope to change state (e.g. change conductivity). Sensor 63 detects the change in state to determine a leak has occurred. Either the sensor 63 or the single sensor aggregator port transmits an electronic leak alert notification such as over IP (Internet Protocol) via email or SNMP communication. Water 54 follows its path of least resistance to the water evacuation gap. From there the water either falls to the floor and through ventilated floor tiles to the underfloor or is collected by tubing that routes the water away from the rack, possibly to the underfloor or a designated collection basin.

While several illustrative embodiments have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A leak protection system for use with a rack-mounted critical system having an overhead cabling structure for routing cabling, said system comprising:
    a panel mounted above the rack-mounted critical system and cabling structure at an angle with a highest point that overhangs the back of the rack towards a hot aisle above the cabling structure and a lowest point that overhangs the front of the rack towards a cold aisle to deflect water that runs down the panel towards a front edge, said panel angled to allow access to the cabling and to direct rising heat out of the back of the rack-mounted critical system to the hot aisle;
    a raised lip that runs along the front edge of the panel at the lowest point to form a water channel to collect water;
    a water detection system positioned in and along the water channel to detect the presence of water and to issue a leak alert; and
    a gap in the water channel to evacuate the collected water.

2. The system of claim 1, wherein the panel is formed of a clear transparent material.

3. The system of claim 2, wherein the clear transparent material comprises an acrylic material.

4. The system of claim 3, wherein the panel is flat.

5. The system of claim 1, wherein the panel is mounted at an angle between five and twenty degrees with respect to a floor on which the rack-mounted critical system rests.

6. The system of claim 1, wherein the water detection system comprises a water detection rope positioned in and along the water channel to detect the presence of water and a sensor responsive to a change in state of the water detection rope to issue the leak alert.

7. The system of claim 1, further comprising tubing coupled to the gap in the water channel to route the water away from the rack.

8. The system of claim 1 for use with a plurality of said rack-mounted critical system positioned side-by-side in a row, said system comprising a plurality of said panels interconnected side-by-side above the row of racks and cabling structure, a plurality of said raised lips that together form the water channel, and a plurality of said gaps in the water channel between each adjacent pair of panels, said water detection system spanning the water channel across the plurality of panels to issue the leak alert in response to the presence of water collected by any one of the panels.

9. The system of claim 8, wherein the interconnected panels form a contiguous panel above the row of rack-mounted critical systems.

10. The system of claim 8, wherein the water detection system comprises a water detection rope positioned in and along the water channel to detect the presence of water on any one of the panels and a sensor responsive to a change in state of the water detection rope to issue the leak alert for the row.

11. The system of claim 8 for use with multiple rows of said rack-mounted critical systems, further comprising a single sensor aggregator port responsive to the leak alert from said water detection systems for said multiple rows to generate and transmit a leak alert notification.

12. A leak protection system, comprising:
    multiple rows of rack-mounted critical systems, each row including multiple rack-mounted critical systems positioned side-by-side, said racks generating heat that rises through the top of the rack, said rows separated by alternating hot and cold aisles;
    a cabling structure above each row for routing cabling to the racks;
    one or more panels mounted side-by-side above each row and the cabling structure at an angle with a high point that overhangs the back of the rack towards the hot aisle above the cabling structure and a low point that overhangs the front of the rack toward the cold aisle to deflect water that runs down the panel towards a front edge, said panel angled to allow access to the cabling and to direct the rising heat out the back of the rack to the hot aisle, said panel formed from a clear transparent acrylic material to allow overhead light through the panel to provide visibility of the cabling and rack-mounted critical systems while limiting the visibility of the panel;

one or more raised lips that run along the front edge of the one or more panels at the low point to form a water channel to collect water in each said row;

multiple water detection systems each comprising a water detector positioned in and along the water channel to detect the presence of water and a sensor that monitors a change in state of the water detector to issue a leak alert;

one or more gaps in the water channel to evacuate the collected water; and a single sensor aggregator port responsive to the leak alert from said water detection systems for said multiple rows to generate and transmit a leak alert notification.

13. The system of claim 12, wherein the panel is flat.

14. The system of claim 12, wherein the panel is mounted at an angle between five and twenty degrees with respect to a floor on which the rack-mounted critical systems rest.

15. The system of claim 12, wherein the water detection system comprises a water detection rope positioned along the water channel to detect the presence of water on any one of the panels in the row and a sensor responsive to a change in state of the water detection rope to issue the leak alert for the row.

16. A leak protection system comprising:

a rack-mounted critical system having an overhead cabling structure for routing cabling;

a panel mounted above the rack-mounted critical system and cabling structure at an angle with a highest point that overhangs the back of the rack towards a hot aisle above the cabling structure and a lowest point that overhangs the front of the rack towards a cold aisle to deflect water to run down the panel towards a front edge, said panel angled to allow access to the cabling and to direct rising heat out of the back of the rack-mounted critical system to the hot aisle;

a raised lip that runs along the front edge of the panel to form a water channel to collect water;

a water detector system positioned in and along the water channel to detect the presence of water and to issue a leak alert; and a gap in the water channel to evacuate the collected water.

17. The system of claim 16, wherein the water detection system comprises a water detection rope positioned in and along the water channel to detect the presence of water and a sensor responsive to a change in state of the water detection rope to issue the leak alert.

18. The system of claim 16 for use with a plurality of said rack-mounted critical system positioned side-by-side in a row, said leak protection system comprising a plurality of said panels mounted side-by-side above the row of racks and cabling structure, a plurality of said raised lips that together form the water channel, and a plurality of said gaps in the water channel between each adjacent pair of panels, said water detection system spanning the water channel across the plurality of panels to issue a leak alert in response to the presence of water collected by any one of the panels.

19. The system of claim 18, wherein the water detection system comprises a water detection rope positioned along the water channel to detect the presence of water on any one of the panels and a sensor responsive to a change in state of the water detection rope to issue the leak alert for the row.

20. The system of claim 18 for use with multiple rows of said rack-mounted critical systems, further comprising a single sensor aggregator port responsive to the leak alert from said water detection systems for said multiple rows to generate and transmit a leak alert notification.

* * * * *